United States Patent
Shebanow

(10) Patent No.: US 8,458,440 B2
(45) Date of Patent: Jun. 4, 2013

(54) DEFERRED COMPLETE VIRTUAL ADDRESS COMPUTATION FOR LOCAL MEMORY SPACE REQUESTS

(75) Inventor: Michael C. Shebanow, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 230 days.

(21) Appl. No.: 12/858,362

(22) Filed: Aug. 17, 2010

(65) Prior Publication Data
US 2011/0078358 A1 Mar. 31, 2011

Related U.S. Application Data

(60) Provisional application No. 61/246,074, filed on Sep. 25, 2009.

(51) Int. Cl.
*G06F 12/00* (2006.01)

(52) U.S. Cl.
USPC .................................... 711/220; 711/E12.025

(58) Field of Classification Search
USPC ............................................ 711/220, E12.058
See application file for complete search history.

(56) References Cited

U.S. PATENT DOCUMENTS

2009/0113164 A1 * 4/2009 Rajamony et al. ............ 711/202
2009/0240931 A1 * 9/2009 Coon et al. ..................... 712/234

* cited by examiner

*Primary Examiner* — Edward Dudek, Jr.
(74) *Attorney, Agent, or Firm* — Patterson & Sheridan, LLP

(57) ABSTRACT

One embodiment of the present invention sets forth a technique for computing virtual addresses for accessing thread data. Components of the complete virtual address for a thread group are used to determine whether or not a cache line corresponding to the complete virtual address is not allocated in the cache. Actual computation of the complete virtual address is deferred until after determining that a cache line corresponding to the complete virtual address is not allocated in the cache.

18 Claims, 10 Drawing Sheets

CONCEPTUAL DIAGRAM

| | | | | | | | | |
|---|---|---|---|---|---|---|---|---|
| Cache Line 530 → | $T_{31}$ | $T_{30}$ | $T_{29}$ | $T_{28}$ | ... | $T_3$ | $T_2$ | $T_1$ | $T_0$ |
| Cache Line 531 → | $T_{31}$ | $T_{30}$ | $T_{29}$ | $T_{28}$ | ... | $T_3$ | $T_2$ | $T_1$ | $T_0$ |
| Cache Line 532 → | $T_{31}$ | $T_{30}$ | $T_{29}$ | $T_{28}$ | ... | $T_3$ | $T_2$ | $T_1$ | $T_0$ |
| Cache Line 533 → | $T_{31}$ | $T_{30}$ | $T_{29}$ | $T_{28}$ | ... | $T_3$ | $T_2$ | $T_1$ | $T_0$ |
| | . | . | . | . | ... | . | . | . | . |
| Cache Line 540 → | $T_{31}$ | $T_{30}$ | $T_{29}$ | $T_{28}$ | ... | $T_3$ | $T_2$ | $T_1$ | $T_0$ |
| Cache Line 541 → | $T_{31}$ | $T_{30}$ | $T_{29}$ | $T_{28}$ | ... | $T_3$ | $T_2$ | $T_1$ | $T_0$ |
| Cache Line 542 → | $T_{31}$ | $T_{30}$ | $T_{29}$ | $T_{28}$ | ... | $T_3$ | $T_2$ | $T_1$ | $T_0$ |
| Cache Line 543 → | $T_{31}$ | $T_{30}$ | $T_{29}$ | $T_{28}$ | ... | $T_3$ | $T_2$ | $T_1$ | $T_0$ |
| | . | . | . | . | ... | . | . | . | . |
| Cache Line 550 → | $T_{31}$ | $T_{30}$ | $T_{29}$ | $T_{28}$ | ... | $T_3$ | $T_2$ | $T_1$ | $T_0$ |
| Cache Line 551 → | $T_{31}$ | $T_{30}$ | $T_{29}$ | $T_{28}$ | ... | $T_3$ | $T_2$ | $T_1$ | $T_0$ |
| Cache Line 552 → | $T_{31}$ | $T_{30}$ | $T_{29}$ | $T_{28}$ | ... | $T_3$ | $T_2$ | $T_1$ | $T_0$ |
| Cache Line 553 → | $T_{31}$ | $T_{30}$ | $T_{29}$ | $T_{28}$ | ... | $T_3$ | $T_2$ | $T_1$ | $T_0$ |

Figure 5A

DEFERRED COMPLETE VIRTUAL ADDRESS COMPUTATION FOR LOCAL MEMORY SPACE REQUESTS

CROSS-REFERENCE TO RELATED APPLICATIONS

This application claims priority benefit to United States provisional patent application titled, "WARP ADDRESS SPACE REDUCES ADDRESS COMPUTATION HARDWARE FOR LOCAL MEMORY SPACE REQUESTS," filed on Sep. 25, 2009 and having Ser. No. 61/246,074.

BACKGROUND OF THE INVENTION

1. Field of the Invention

Embodiments of the invention relate generally to a thread group address space that reduces virtual address computation circuitry for local memory space accesses.

2. Description of the Related Art

In a conventional system accesses to a local memory space by multiple threads may be performed in parallel by computing unique virtual addresses for each one of the threads in parallel. Computation of the unique virtual addresses may be a complex operation requiring dedicated circuitry for each one of the threads. When the data for the threads is cached, checking whether or not the data for each of the unique virtual addresses may also be performed in parallel, again requiring dedicated circuitry for the cache tag comparison operation. As the number of parallel threads increases, the amount of dedicated circuitry also increases. The performance of the unique virtual address computation and/or cache tag comparison may be reduced as the amount of time needed to perform the operations increases along with the increase in parallel threads.

Accordingly, what is needed in the art is an improved system and method for computing unique virtual addresses for each thread and performing the cache tag comparison.

SUMMARY OF THE INVENTION

A system and method for computing virtual addresses for accessing thread data defers computation of a complete virtual address computation until after a cache tag comparison indicates that the data for a thread is not stored in a cache. Cache hits/misses are determined using a thread group address. When the different threads in a group have different per-thread addresses, the cache accesses are serialized and complete virtual address computations for cache misses are performed also performed serially. Computation of the unique virtual addresses is performed without requiring dedicated circuitry for each one of the threads in the thread group. Similarly, determination of cache hits/misses is also performed without comparing unique virtual addresses for each one of the threads in parallel.

Various embodiments of a method of the invention for computing a virtual address for a thread group, include receiving components of a complete virtual address associated with a thread group, the components including a thread group address and a thread group identifier and determining that a cache miss occurs indicating that a cache line corresponding to the components is not allocated in a cache. After determining that the cache miss occurred, the complete virtual address is computed using the components and a location in a memory associated with the complete virtual address is accessed to load or store data.

Various embodiments of the invention include a system for computing a virtual address for a thread group. The system includes a streaming multi-processor that includes a cache coupled to a backing memory. The cache is configured to receive components of a complete virtual address associated with a thread group, the components including a thread group address and a thread group identifier. The cache is also configured to determine that a cache miss occurs indicating that a cache line corresponding to the components is not allocated in a cache and compute, after determining that the cache miss occurred, the complete virtual address using the components. A location in the backing memory associated with the complete virtual address is then accessed to load or store data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5A is a conceptual diagram of the cache line organization of the L1 cache, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
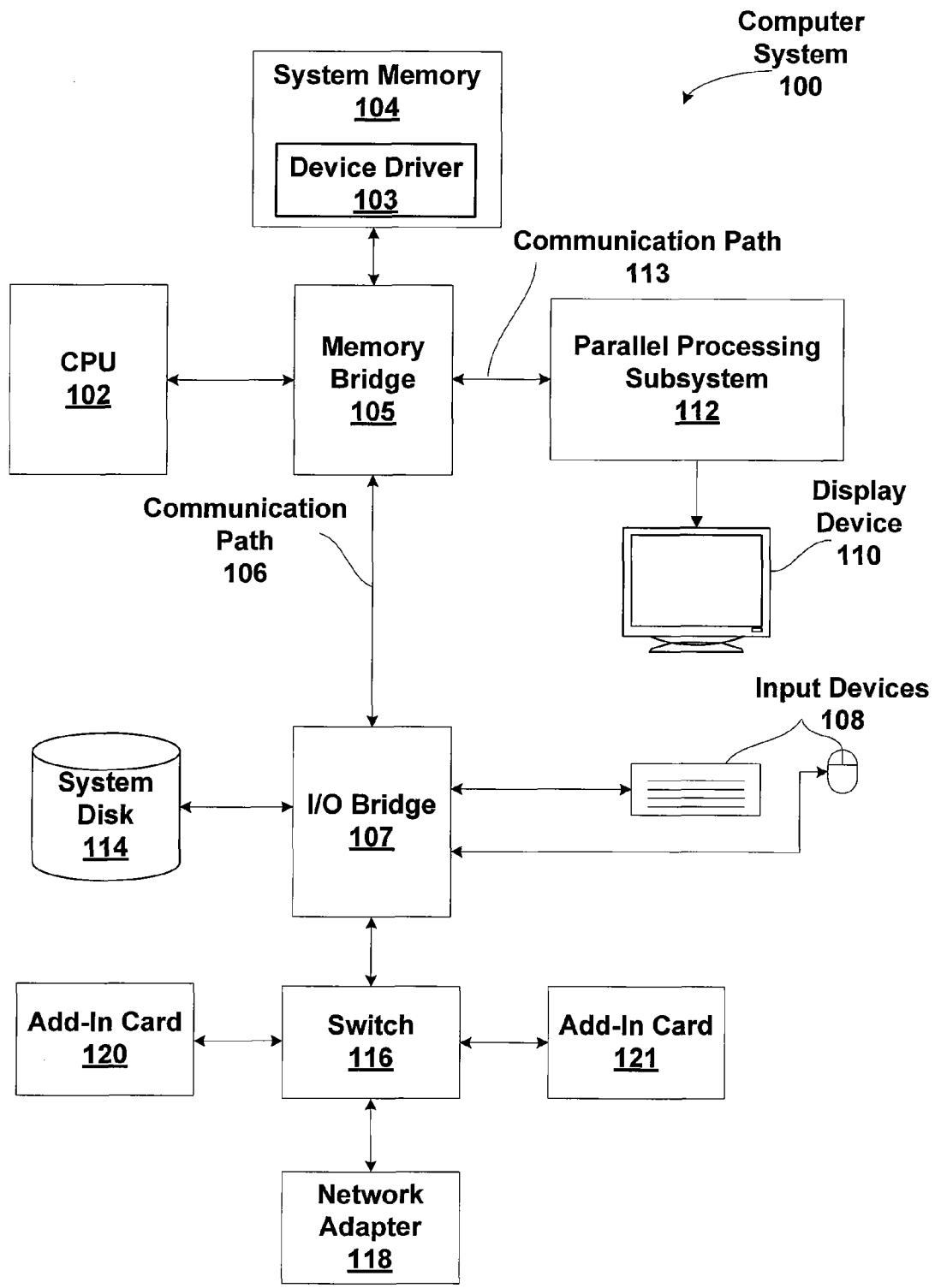
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
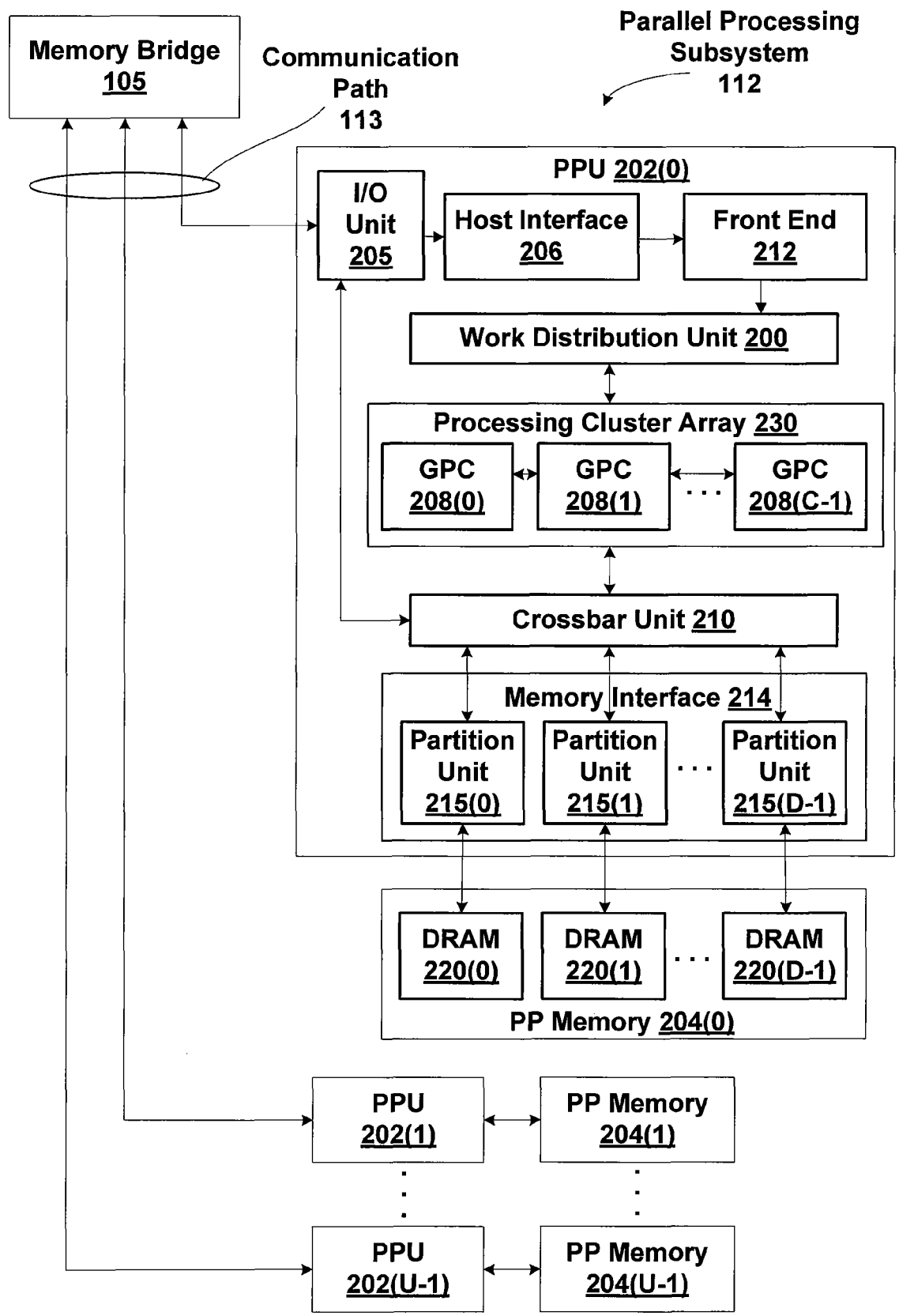
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≧1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
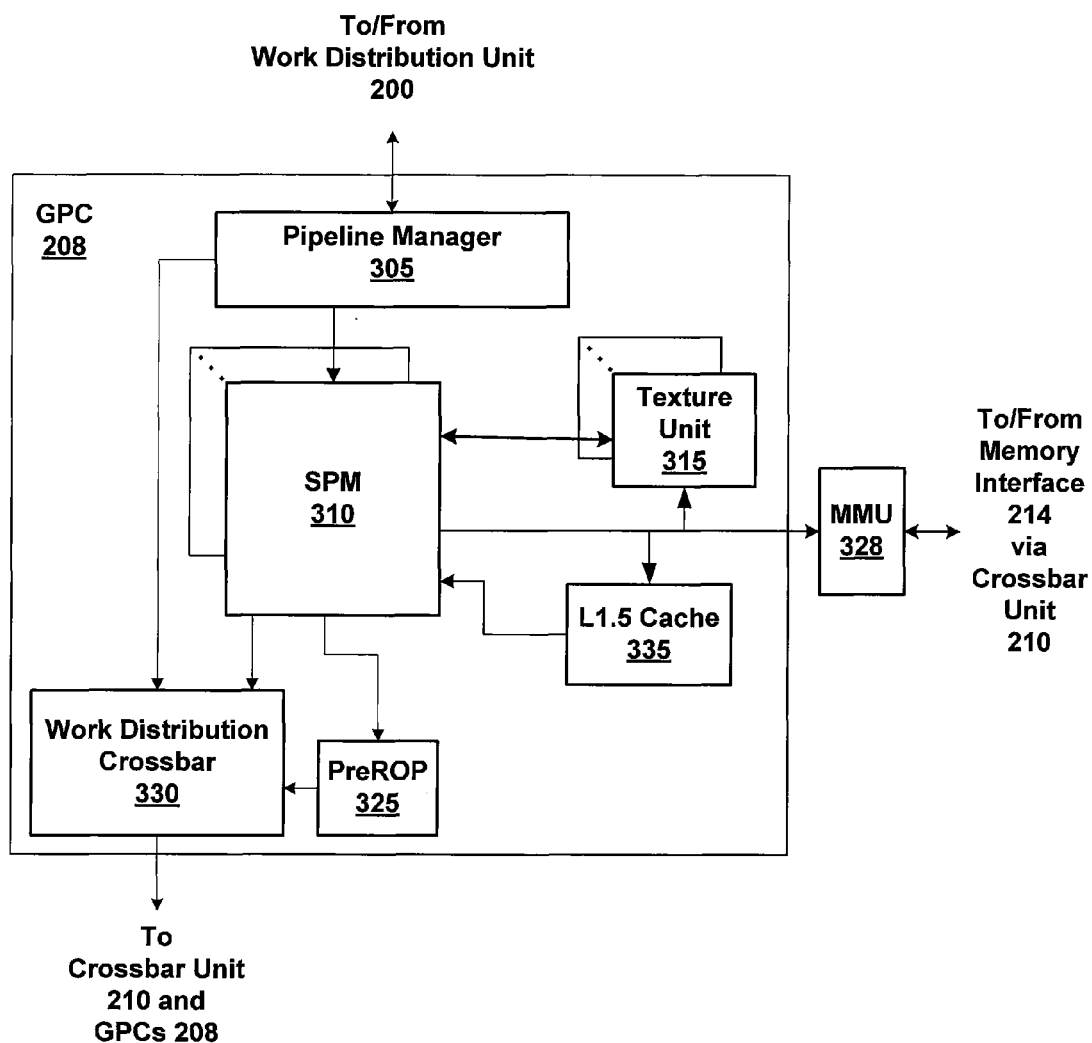
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may specify destinations for processed data output by SPMs 310 that are routed through a work distribution crossbar 330.

In one embodiment, each GPC 208 includes a number M of SPMs 310, where M≧1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

A collection of a certain number of concurrently executing threads across the parallel processing engines (not shown) within an SPM 310 is referred to herein as a "warp" or "thread group." As used herein, a "thread group" or "warp" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently launched threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operation unit) 325 is configured to collect shader work for processing by the SPMs 310, and collect pixel color/Z/stencil data for processing by the ROP 360.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
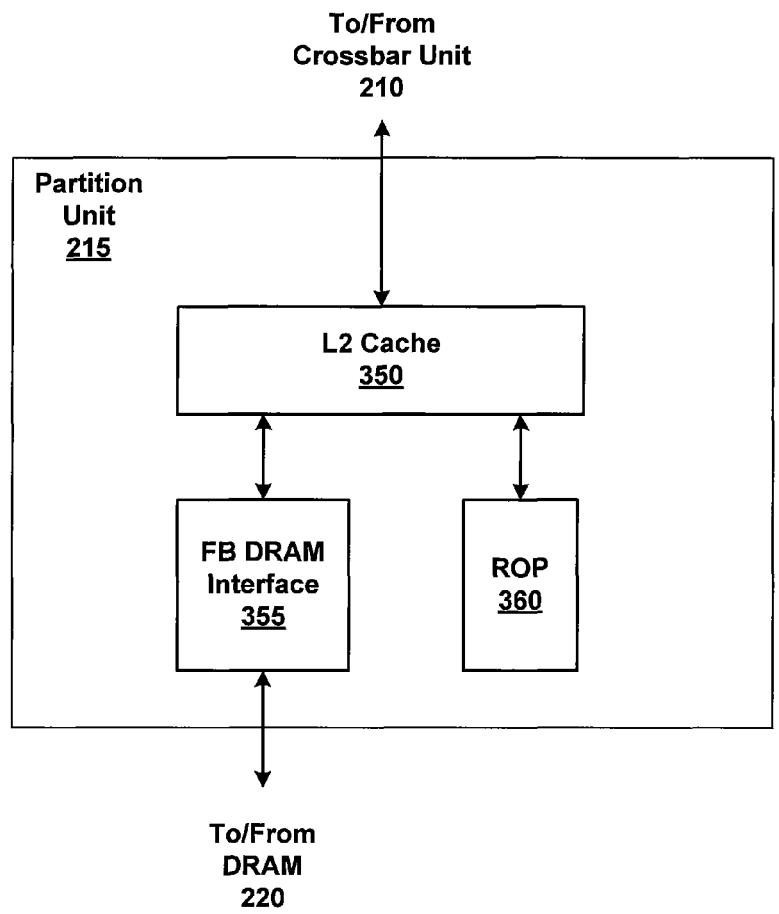
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read. In one embodiment, the address may be a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CIA" and "thread array" are used synonymously herein.

Figure 3C:
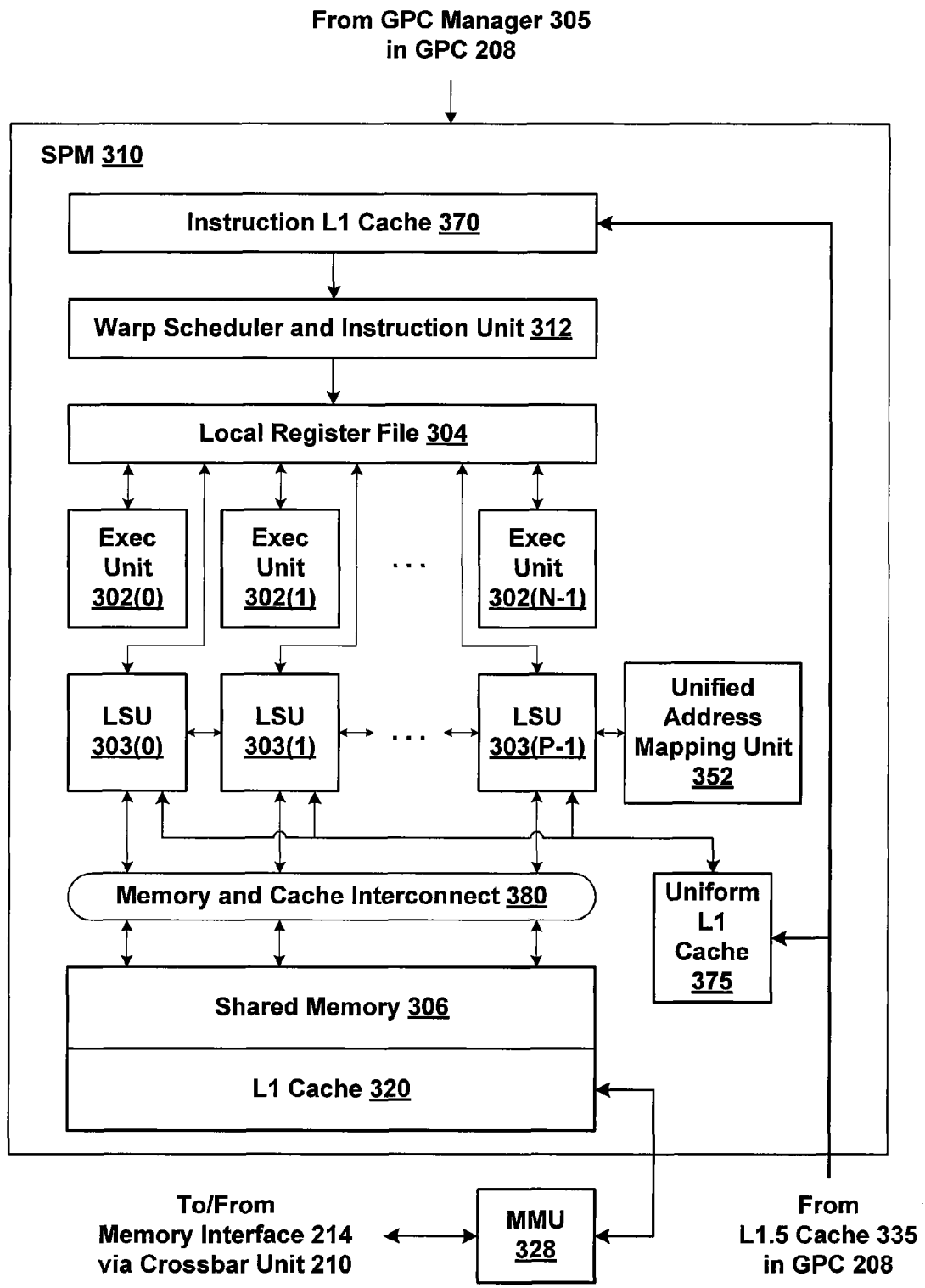
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
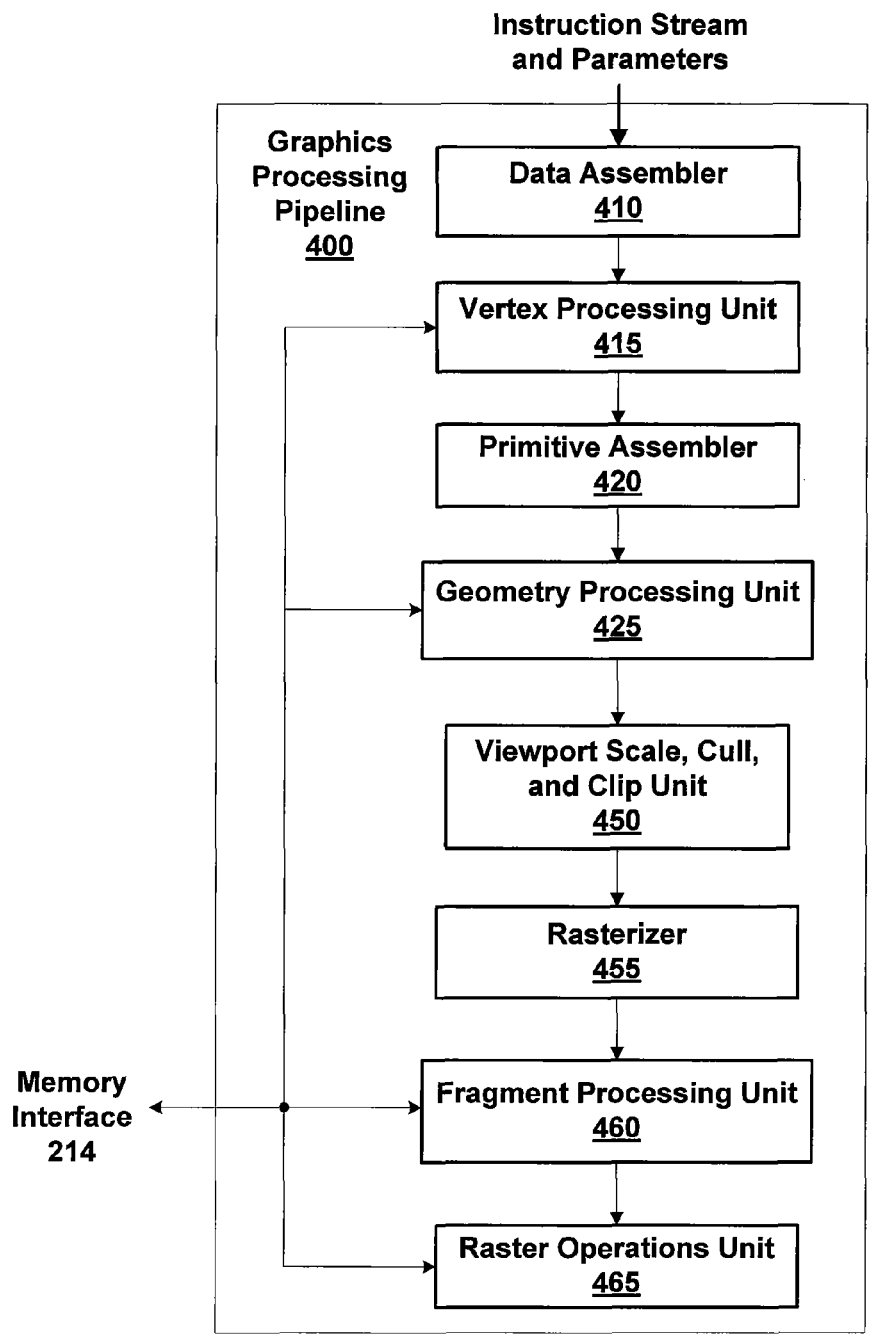
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Although the method steps are described in conjunction with the systems of FIGS. 1, 2, 3A, 3B, and 3C, persons skilled in the art will understand that any system configured to perform the method steps, in any order, is within the scope of the inventions.

Deferred Complete Virtual Address Computation

Different address spaces that are accessed during thread execution. A first address space is a generic thread address space, a second address space is a virtual address space, and a third address space is the physical memory. In one embodiment the generic thread address space is a $2^{40}$ byte address space generated by SPM 310 address operations and the virtual address space is a $2^{40}$ byte address space generated after determining the specific portion (window) of the generic thread address space accessed by the SPM 310 is being accessed, and input to the MMU 328 to access memory. The different windows of the generic thread address space may include a local per-thread memory and a shared per-CTA shared memory. The local per-thread memory may be further divided into windows for storage for per-thread global values and per-thread data stacks.

Load (LD) and store (ST) instructions received by the SPM 310 generate generic thread address space addresses with the exception of LDL/STL and LDS/STS type instructions. The LD/STL and LDS/STS type instructions generate offsets with respect to the local per-thread and shared per-CTA windows of the generic thread address space. Various parameters may describe the different windows within the generic thread address space, such as a W_LCL_BASE and AW_LCL_SZ that describe the position within the generic thread address space and the size of the local per-thread window, respectively. In some embodiments the W_LCL_BASE is aligned on a 16 MB boundary, the W_LCL_SZ is a fixed 16 MB value, and the LCL window is restricted to the first 4 GB of the generic thread address space. The LCL window spaces are backed by storage in the virtual address space.

Within the LCL window, two other sub-windows, i.e., a LCL_HI window and LCL_LO window for the storage of the per-thread global values and the per-thread data stacks, respectively, may be defined. The parameters x.LCL_LO_SZ and x.LCL_HI_SZ are programmable sizes that may be specified in increments of 16 bytes, and may use a minimum value of 0 bytes and a maximum value of 512 KB per thread.

Within the LCL window, there may be three address ranges defined by the LCL_LO and the LCL_HI windows. Generic thread address space addresses in the range W_LCL_BASE to W_LCL_BASE+x.LCL_LO_SZ-1 are decoded as LCL_LO references unless the sub-window is disabled (when x.LCL_LO_SZ is zero). Generic thread address space addresses between W_LCL_BASE+x.LCL_LO_SZ and W_LCL_BASE+W_LCL_SZ–x.LCL_HI_SZ-1 are decoded as illegal references since those addresses do no lie in either the LCL_LO or the LCL_HI window. Generic thread address space addresses between W_LCL_BASE+W_LCL_SZ–x.LCL_HI_SZ and W_LCL_BASE+W_LCL_SZ-1 are decoded as LCL_HI references unless the sub-window is disabled (when x.LCL_HI_SZ is zero). Finally, generic thread address space addresses not falling within any window, including a window defining the shared window address space, are treated as global addresses and are left unchanged when mapped to the virtual address space addresses.

The default size of virtual memory that is allocated for each thread group is determined based on D_WARP_MEM_SZ that may be specified in increments of 512 bytes with a range of zero to 33 MB. In one embodiment, the actual amount of virtual address space memory allocated per thread group is determined by the following equation:

$$shRequired=32*(x.LCL\_LO\_SZ+x.LCL\_HI\_SZ)+x.CRS\_SZ$$

$$WARP\_LCL\_SZ=\max(D\_WARP\_MEM\_SZ, shRequired)$$

The value WARP_LCL_SZ is recomputed by the device driver 103 each time any shader is rebound. If the value changes due to a rebind, any SPM 310 will be flushed prior to running shaders with the new allocation.

The two sub-windows LCL_LO and LCL_HI are relocated to a SPM-specific and thread group-specific section of the virtual address space. The device driver 103 allocates a single contiguous heap for the LCL memory within the virtual address space. The base of this heap is defined by, D_LCL_BASE. The size of the heap is D_LCL_SZ. In one embodiment, D_LCL_BASE is aligned on a 4 KB boundary and D_LCL_SZ is in increments of 128 KB up to a maximum of 128 GB (37 bits effective, 20 bits actual). Each SPM 310 is allocated a fixed chunk of this heap of size SM_LCL_SZ at a location SM_LCL_BASE[n] for logical SPM identifier 'n.' The fixed chunk size and location is computed by the device driver 103 using the following equations:

$$SM\_LCL\_SZ=\text{floor}(D\_LCL\_SZ/NUM\_SM) \text{ and}$$

$$SM\_LCL\_BASE[n]=n*SM\_LCL\_SZ+D\_LCL\_BASE.$$

The chunk size may be continuously evaluated against the minimal requirement per thread group to compute the maximum number of thread groups that can run on the particular SPM 310 based on a maximum number of thread groups that an SPM 310 can execute simultaneously which may be limited by the amount of available per-CTA shared memory space.

The SPM 310 LCL heap is further subdivided into two or more sections, in particular a LCL_LO, and a LCL_HI. Each section may consists of a set of 512 byte blocks interleaved on a per-thread group basis, with NWARPS being the repeat rate, as described in conjunction with FIG. 5B. The generic thread address space is interleaved in this fashion to distribute memory accesses from each SPM 310 across the different FB DRAM partitions and avoid having any one SPM 310 access only a particular FB DRAM partition.

In some embodiments, each thread accessing a generic thread address space memory computes a 40-bit thread address (TA). The thread address is converted into an effective address by subtracting a base address for the LCL window (W_LCL_BASE) from the thread address. The effective address may also be generated directly via the LDL and STL instructions. Effective addresses that are within the LCL window are converted to a value compatible with the virtual address space. To do so, an effective address (EA) is scaled and offset to create a thread group address space (TGAS) address using the following equations:

$$Temp=(EA[18:2]<<7)+(TID[4:0]<<2)+EA[1:0] \text{ and}$$

$$TGAS \text{ address}=Temp+(TGAS \text{ base address}),$$

where TID[4:0] is the thread identifier for a thread in the thread group and the TGAS base address is the base address of the TGAS address space. The insertion of thread ID (TID) is required to make each TGAS address a per-thread unique address.

FIG. 5A is a conceptual diagram of the cache line organization of the L1 cache 320, according to one embodiment of the present invention. Each cache line stores data for each thread in one thread group. In one embodiment each cache line stores 128 bytes of data, so a cache line stores 4 bytes of data for each thread when there are 32 threads in a thread group. The data for a particular thread group is interleaved with data for the other thread groups at the granularity of 512 byte blocks. For example, cache lines 530-533 may store data for each thread in a first thread group, cache lines 540-543 may store data for each thread in a second thread group, and cache lines 550-553 may store data for each thread in a third thread group. Accordingly, the 512-byte blocks are interleaved on a per-thread group basis.

The TGAS addresses may specify a different address for one or more of the threads in the thread group and the different addresses may correspond to different cache lines. For example, a load or store instruction may encode the thread address for the destination or source, respectively, using a base address, Ra and an immediate value. The Ra may be summed with the immediate value to produce the thread address (TA). The Ra may be different for one or more of the threads in the thread group. When the Ra value is different for one or more active threads in the thread group, the threads diverge and the request is serialized to access each of the different per-thread addresses in sequence.

For example, a first thread, T0 in a thread group may specify an address for data stored in cache line 330 and a second thread, T1 in the same thread group may specify an address for data stored in cache line 340. Since the first and second threads diverge, the cache access for the first thread is serialized with respect to the cache access for the second thread. When the threads are executed uniformly, all of the active threads in a group typically specify thread addresses for data stored in a single cache line. Therefore, a single cache access is able to process the request, assuming a cache hit. When the threads diverge, multiple cache accesses are needed to process the request, again assuming cache hits.

Figure 5B:
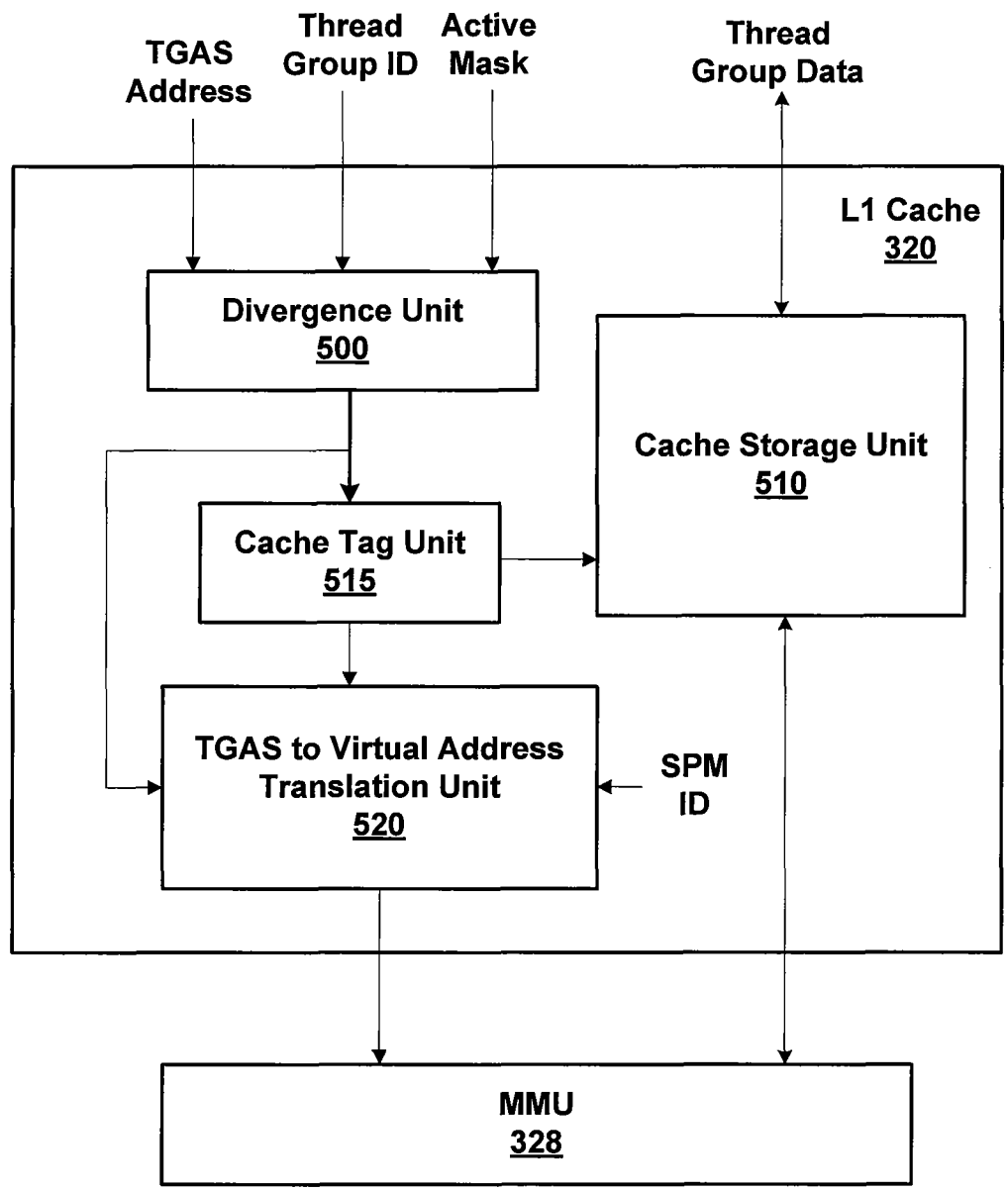
FIG. 5B is a block diagram of the L1 cache of FIG. 3C, according to one embodiment of the present invention.

FIG. 5B is a block diagram of the L1 cache 320 of FIG. 3C, according to one embodiment of the present invention. The L1 cache 320 includes a divergence unit 500, a cache tag unit 515, a cache storage unit 510, and a TGAS to virtual address translation unit 520. The protocol between the L1 cache 320 and LSUs 303 with respect to the LCL window is straight forward. The LSUs 303 pass TGAS-based addresses, a thread group ID, and an active mask to the L1 cache 320 for each LCL memory access. The thread group ID uniquely identifies the thread group making the memory access request and the active mask indicates the specific threads in the thread group that are active. When the request is a load, thread group data is provided to the cache storage unit 510. The L1 cache 320 caches LCL memory using a tag that is the concatenation of the thread group ID and TGAS address. Upon a cache miss, the TGAS to virtual address translation unit 520 converts the TGAS address to a true virtual address.

The divergence unit 500 receives the TGAS addresses for the threads, active mask, and the thread group ID and determines if any of the active threads diverge. Threads in a warp having the same Ra do not diverge. When the threads do diverge, each different TGAS address is output serially along with a match mask that indicates which active threads are associated with the particular TGAS address. The cache tag unit 515 receives the tag (concatenation of the thread ID and TGAS address) for the active threads in the thread group and determines whether or not the a cache line is allocated for the tag. In one embodiment the cache tag unit 515 is configured to process a single tag at a time. When a cache hit occurs, the cache storage unit 510 reads or write a cache line to process the request. When a cache miss (not a hit) occurs, the TGAS to virtual address translation unit 520 translates the TGAS address output by the divergence unit 500 into a complete virtual address (VA). The following equation may be used to convert the TGAS address to the VA:

$$VA=(TGAS\ Address[25:9]*NWARPS+Thread\ Group\ ID)\times 512+SM\_LCL\_BASE[n]+TGAS\ Address[8:0],$$

where 'n' is the SM logical ID. The virtual address is then used to access memory. Note that the computation of VA requires a multiplication operation that is more complex than the operations needed to compute the TGAS address. Therefore, it is advantageous to defer or avoid performing this multiplication operation.

By employing a TGAS-based address, the SPM 310 can defer or avoid the final virtual address computation until after determining whether or not a cache hit occurred for a memory access. Since the final address computation is done after a cache miss, the calculation can be performed at much lower comparable bandwidth than if the calculation had been done prior to the L1 cache 320.

Figure 6A:
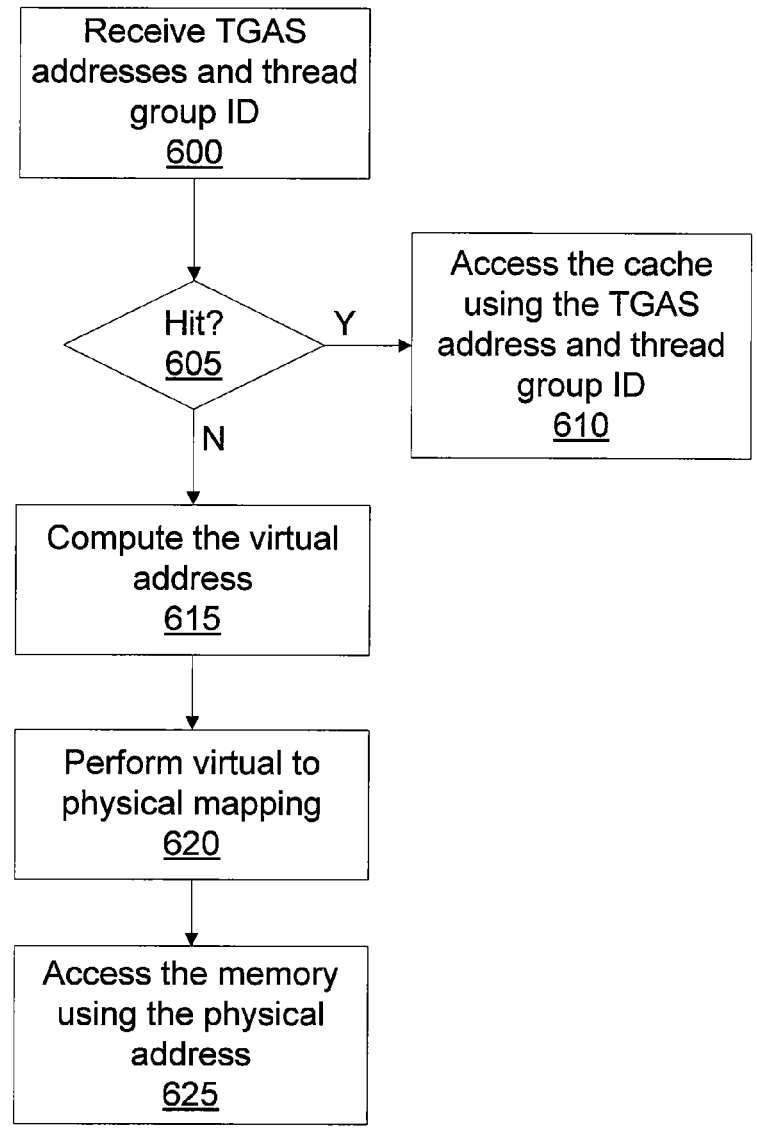
FIG. 6A is a flow diagram of method steps computing a complete virtual address to access thread data, according to one embodiment of the present invention.

FIG. 6A is a flow diagram of method steps computing a complete virtual address to access thread data, according to one embodiment of the present invention. This embodiment assumes that all threads in a thread group are synchronized and therefore specify the same TGAS address. In other words, there can be no thread divergence for load and store operations. In one embodiment, there is no divergence when the threads resolve to the same cache line. At step 600 the L1 cache 320 receives components of a complete virtual address, e.g., the TGAS address for the threads in a thread group, thread group ID, and active mask. At step 605 the cache tag unit 515 determines if a cache hit occurs for the tag (concatenation of the thread group ID and TGAS address). If, a hit does occur, then at step 610 the cache storage unit 510 is accessed using the tag. Otherwise, at step 615 the TGAS to virtual address translation unit 520 computes the complete virtual address. At step 620 the MMU 328 performs virtual to physical address mapping. At step 625 the memory is accessed using the physical address.

Figure 6B:
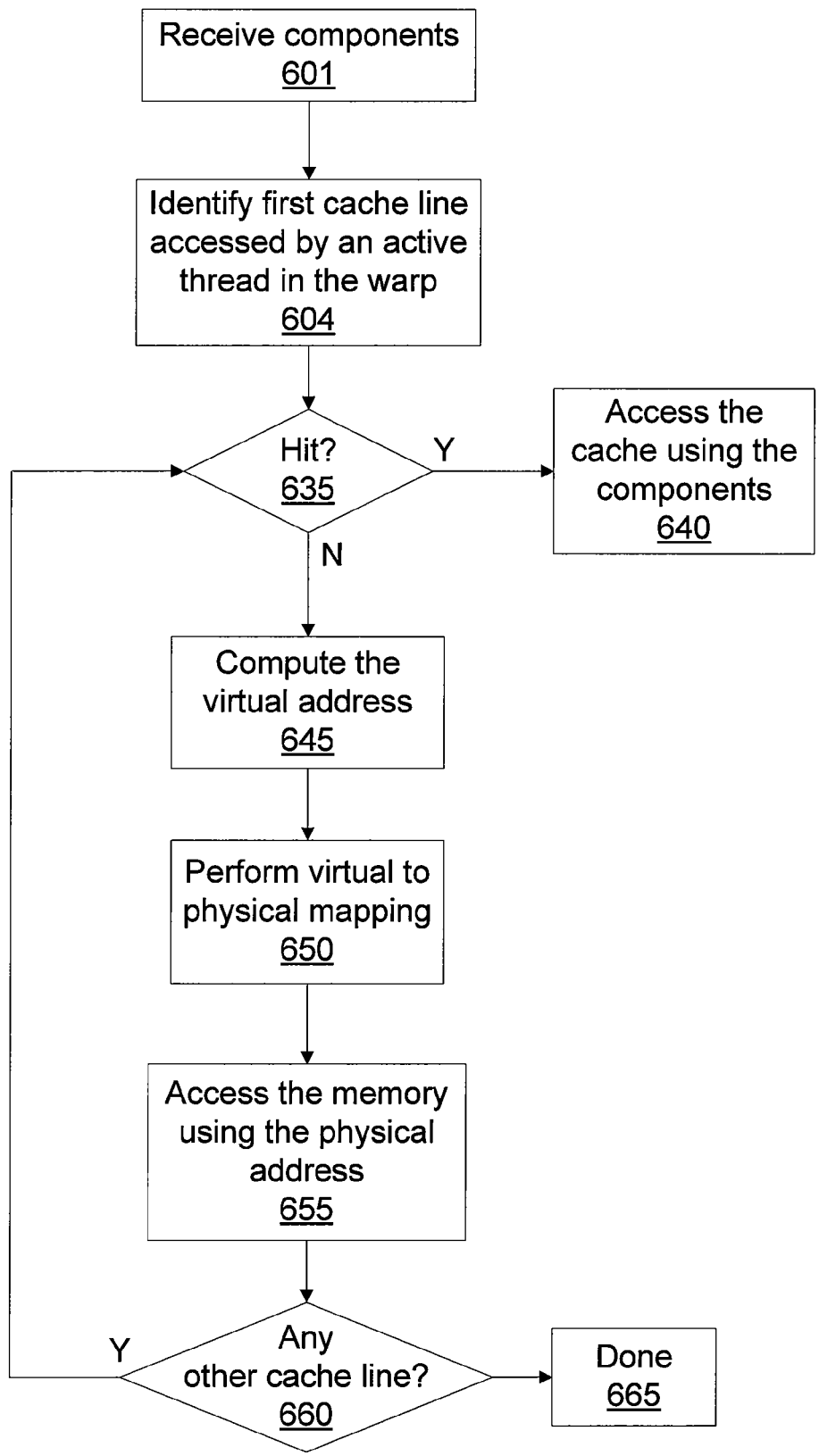
FIG. 6B is a flow diagram of method steps computing a complete virtual address to access thread data for unique per-thread virtual addresses, according to one embodiment of the present invention.

FIG. 6B is a flow diagram of method steps computing a complete virtual address to access thread data for unique per-thread virtual addresses, according to one embodiment of the present invention. This embodiment assumes that threads in a thread group may specify different TGAS addresses. In other words, there can be thread divergence for load and store operations. At step 601 the L1 cache 320 receives components of a complete virtual address, e.g., TGAS addresses for threads in a thread group, thread group ID, and active mask.

At step 604 the divergence unit identifies the first cache line that is accessed by an active thread in the thread group. There may be one or more different per-thread TGAS addresses and the different TGAS addresses may correspond to different cache lines. At step 635 the cache tag unit 515 determines if a cache hit occurs for the tag (concatenation of the thread group ID and TGAS address). If, a hit does occur, then at step 640 the cache storage unit 510 is accessed using the tag. Otherwise, at step 645 the TGAS to virtual address translation unit 520 computes the complete virtual address. At step 650 the MMU 328 performs virtual to physical address mapping. At step 655 the memory is accessed using the physical address. Note that steps 645, 650, and 655 may be performed in parallel with the cache hit/miss determination during serialization of the per-thread accesses.

At step 660 the divergence unit 500 determines if any other cache line (different than the first cache line identified in step 604) is accessed by one of the active threads in the thread group, and, if not, then the processing of the request is complete. Otherwise, step 640 or steps 645, 650, 655, and 660 are repeated for the next different cache line accessed by one of the active threads in the thread group.

When the accesses to the per-thread local memory space are uniform for the threads in a thread group, then a single tag comparison will indicate whether or not a cache line corresponding to the complete virtual address is present in the cache. Importantly, computation of the complete virtual address is deferred, avoided in the case of a cache hit, until after the tag comparison occurs. Threads performing uniform accesses may be processed in parallel and use common virtual address computation circuitry. Threads that diverge and do not perform uniform accesses may be processed serially to use the common virtual address computation circuitry and so that only a single tag comparison is performed for each unique thread address.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for computing a virtual address for a thread group, comprising:
   receiving components of a complete virtual address associated with a thread group, the components including a thread group address and a thread group identifier;
   determining that a cache miss occurs indicating that a cache line corresponding to the components is not allocated in a cache;
   computing, after determining that the cache miss occurred, the complete virtual address using the components; and
   accessing a location in a memory associated with the complete virtual address to load or store data.

2. The method of claim 1, wherein the thread group address includes a separate address for each one of the threads in the thread group.

3. The method of claim 2, further comprising the step of determining that a first one of the separate addresses is different from a second one of the separate addresses indicating that the threads diverge.

4. The method of claim 3, further comprising the step of determining if a second cache miss occurs for the second one of the separate addresses indicating that a cache line corresponding to the second one of the separate addresses is not allocated in the cache.

5. The method of claim 3, further comprising the step of accessing a first cache line corresponding to the second one of the separate addresses when a cache hit occurs.

6. The method of claim 1, wherein a cache tag is used to determine that the cache miss occurs and the cache tag is generated by concatenating the thread group address and the thread group identifier.

7. The method of claim 1, wherein the complete virtual address is computed based on the components and a number of thread groups being concurrently executed by a streaming multi-processor.

8. The method of claim 1, wherein the complete virtual address corresponds to a portion of the memory allocated for exclusive access by only one thread in the thread group.

9. A non-transitory computer-readable storage medium storing instructions that, when executed by a processor, cause the processor to compute a virtual address for a thread group, by performing the steps of:
   receiving components of a complete virtual address associated with a thread group, the components including a thread group address and a thread group identifier;
   determining that a cache miss occurs indicating that a cache line corresponding to the components is not allocated in a cache;
   computing, after determining that the cache miss occurred, the complete virtual address using the components; and
   accessing a location in a memory associated with the complete virtual address to load or store data.

10. A system for computing a virtual address for a thread group, the system comprising:
    a streaming multi-processor including a cache that is coupled to a backing memory and configured to:
    receive components of a complete virtual address associated with a thread group, the components including a thread group address and a thread group identifier;
    determine that a cache miss occurs indicating that a cache line corresponding to the components is not allocated in a cache;
    compute, after determining that the cache miss occurred, the complete virtual address using the components; and
    access a location in the backing memory associated with the complete virtual address to load or store data.

11. The system of claim 10, further comprising a memory storing instructions that, when executed by the streaming multi-processor, configures the cache to:
    receive the components;
    determine that the cache miss occurs;
    compute the complete virtual address; and
    access the location in the backing memory.

12. The system of claim 10, wherein the thread group address includes a separate address for each one of the threads in the thread group.

13. The system of claim 12, wherein the cache is further configured to determine that a first one of the separate addresses is different from a second one of the separate addresses indicating that the threads diverge.

14. The system of claim 13, wherein the cache is further configured to determine if a second cache miss occurs for the second one of the separate addresses indicating that a cache line corresponding to the second one of the separate addresses is not allocated in the cache.

15. The system of claim 13, wherein the cache is further configured to access a first cache line corresponding to the second one of the separate addresses when a cache hit occurs.

16. The system of claim 10, wherein the cache is further configured to use a cache tag to determine that the cache miss occurs and the cache tag is generated by concatenating the thread group address and the thread group identifier.

17. The system of claim 10, wherein the complete virtual address is computed based on the components and a number of thread groups being concurrently executed by the streaming multi-processor.

18. The system of claim 10, wherein the complete virtual address corresponds to a portion of the backing memory allocated for exclusive access by only one thread in the thread group.

* * * * *